Figure 1:
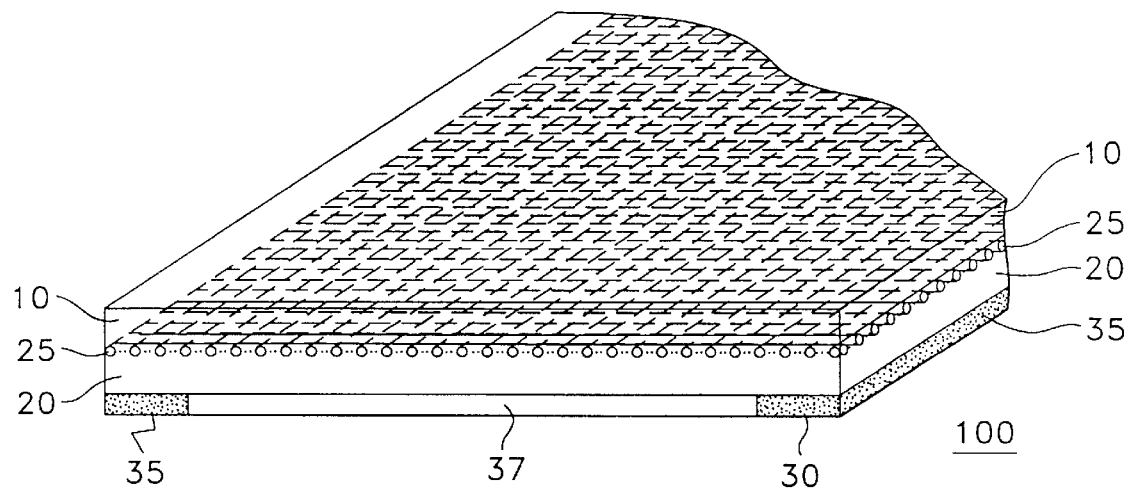

United States Patent
Porter et al.

[11] Patent Number: 5,869,408
[45] Date of Patent: Feb. 9, 1999

[54] HAND-TEARABLE MOISTURE BARRIER LAMINATE

[75] Inventors: John Porter; Rosalene Brunka, both of St. Catharimes, Canada

[73] Assignee: Bay Mills Ltd., Ontario, Canada

[21] Appl. No.: 927,567

[22] Filed: Sep. 8, 1997

Related U.S. Application Data

[62] Division of Ser. No. 482,633, Jun. 7, 1995, Pat. No. 5,733,824.

[51] Int. Cl.$^6$ .................................................. B32B 7/00
[52] U.S. Cl. ........................... 442/153; 442/76; 442/79; 442/86; 442/154; 442/155; 442/381; 442/385; 442/412
[58] Field of Search .......................... 442/76, 79, 86, 442/153, 154, 155, 381, 385, 412

[56] References Cited

U.S. PATENT DOCUMENTS

| | | | |
|---|---|---|---|
| 3,870,592 | 3/1975 | Broer et al. | 161/148 |
| 5,374,477 | 12/1994 | Lawless et al. | 428/317.3 |
| 5,409,761 | 4/1995 | Langley | 428/198 |

FOREIGN PATENT DOCUMENTS

0399952 A1  5/1990  European Pat. Off. .

OTHER PUBLICATIONS

Parsec trade literature entitled "The Energy Saving Parsec Thermo–Brite System", Parsec, Incorporated, Dallas, Texas, 1989.
Parsec trade literature entitled "Control Air and Vapor Infiltration with Parsec Thermo–Brite Tape", Parsec, Incorporated, Dallas, Texas, undated.
Parsec trade literature entitled "Parsec Thermo–Brite Tapes", Parsec, Incorporated, Dallas, Texas, undated.

Primary Examiner—Helen L. Pezzuto
Attorney, Agent, or Firm—Duane, Morris & Heckscher LLP

[57] ABSTRACT

Hand-tearable barrier laminates are provided which include a reinforcing layer having a first tensile strength laminated to flexible cellulosic web comprising open porosity and a second tensile strength which is less than the first tensile strength. The web is treated with a water-resistant polymeric resin for providing liquid water resistance to the web while permitting water vapor to pass through it. Inexpensive web materials can be substituted for polymer foam and microperforated plastic films currently employed by the housing industry.

9 Claims, 2 Drawing Sheets

HAND-TEARABLE MOISTURE BARRIER LAMINATE

RELATED APPLICATIONS

This application is a division of U.S. patent application Ser. No. 08/482,633, filed Jun. 7, 1995, now U.S. Pat. No. 5,733,824.

FIELD OF THE INVENTION

This invention relates to barrier laminates for resisting the penetration of liquid water while permitting the passage of water vapor, and in particular, to barrier laminate materials suitable for providing a moisture barrier for such applications as buildings, packaging and clothing.

BACKGROUND OF THE INVENTION

Sheet materials are widely available for wrapping the exterior surfaces of buildings prior to the attachment of siding materials. Housewraps, as they are called in the trade, restrict the passage of rain water and ambient air from entering the interior of a building, permit water vapor to escape and help to contain "conditioned" air in the interior of the structure.

Some housewraps that are currently in the marketplace include TYVEK, a high density polyethylene spun-bonded sheet material from duPont Company, Wilmington, Del., TYPAR house wrap, spun-bonded polypropylene fiber mat material from Reemeay, Inc., Old Hickory, Tenn. and RUFCO-WRAP, a microperforated polyethylene sheet material sold by Raven Industries, Inc., Sioux Falls, S.D.

More recently, laminated barrier strips have been available to effectively reduce air and water leakage at gaps and joints in sheathing material. One such product is THERMO-BRITE tapes available through Parsec, Incorporated, Dallas, Tex. Such tapes are specially designed with pressure-sensitive adhesive strips and paper release backing layers for easy application at a job site. The tapes can be applied to sheathing joints, sheathing damage, window and door openings, electrical conduits and plumbing lines, for example. They are typically provided in two inch or four inch widths. Like housewrap material, such tapes resist the penetration of liquid water and reduce air leakage. Such products have recently been reported in U.S. Pat. No. 5,374,477 dated Dec. 20, 1994 and European Patent Application No. 399,952 published on Nov. 28, 1990.

While these adhesive-backed barrier strips and housewraps provide a breathable water barrier for joints and gaps between structural members of a building, they are typically manufactured from rather expensive polymeric sheet or foam materials which incorporate minute passageways between their major surfaces for permitting the passage of water vapor while restricting the passage of liquid water and air. Such specially-made polymeric materials are tough and resilient, and must be carefully cut at the job site with razor-edged cutting tools.

SUMMARY OF THE INVENTION

Barrier laminates are provided which include a fiber-reinforced mat including a first tensile strength bonded to a flexible, vapor-porous, cellulosic web made with inexpensive fibers. The porous web has a second tensile strength which is less than the first tensile strength. The resulting laminate is easily hand-torn, like a paper product, but is strong enough for exterior application on buildings. In order to provide sufficient liquid resistance, and preferably liquid repellency, to the web to make it behave as a liquid barrier, it is treated with a resinous material which transforms the surface properties of the web to still permit the passage of vapor but substantially reduce the passage of liquids.

The present invention provides a hand-tearable and less expensive liquid barrier for garments, buildings and packaging. This material is light-weight and breathable, yet is an effective defense against the elements. The laminates of this invention can be equipped with adhesive means for easy attachment over joints or gaps between wood, metal or plastic structural members.

This invention takes advantage of inexpensive porous web materials, such as tissue paper, which can be reinforced with a fibrous scrim-like material to provide sufficient mechanical strength and then impregnated with a water-resistant resinous treatment to provide waterproofing. This improves the properties of these inexpensive cellulosic materials so that they can compete with the high density spun-bonded thermoplastic and polymeric foam materials of the prior art. Unlike these prior art materials, however, the present laminate can unexpectedly be torn by a worker's hands with minimal effort. It is also more heat resistant, so that it can be applied, or treated, with hot melt polymers, and more readily accepts water or solvent-based inks and fire-resistant additives.

In a further embodiment of this invention, a process of preparing a barrier laminate is provided which includes the steps of providing a fiber-reinforced layer having a first tensile strength and laminating this reinforced layer with heat and/or pressure to a porous, tissue-like web having a lower tensile strength. The web, with or without the reinforcing layer, is then impregnated with a water-resistant resin which provides the cellulosic web with resistance to liquid water without significantly interfering with its tearability or its ability to pass water vapor. The resulting laminate has an ASTM D-1117 tear test of no more than about 2–3 lbs in the machine and cross-machine directions, or roughly about 20 to 30% of the tear resistance of a TYVEK sheet.

In still further embodiments of this invention, building structures sealed with the laminated barrier strips of this invention are provided as well as procedures for sealing structures.

A BRIEF DESCRIPTION OF THE DRAWINGS

Figure 3:
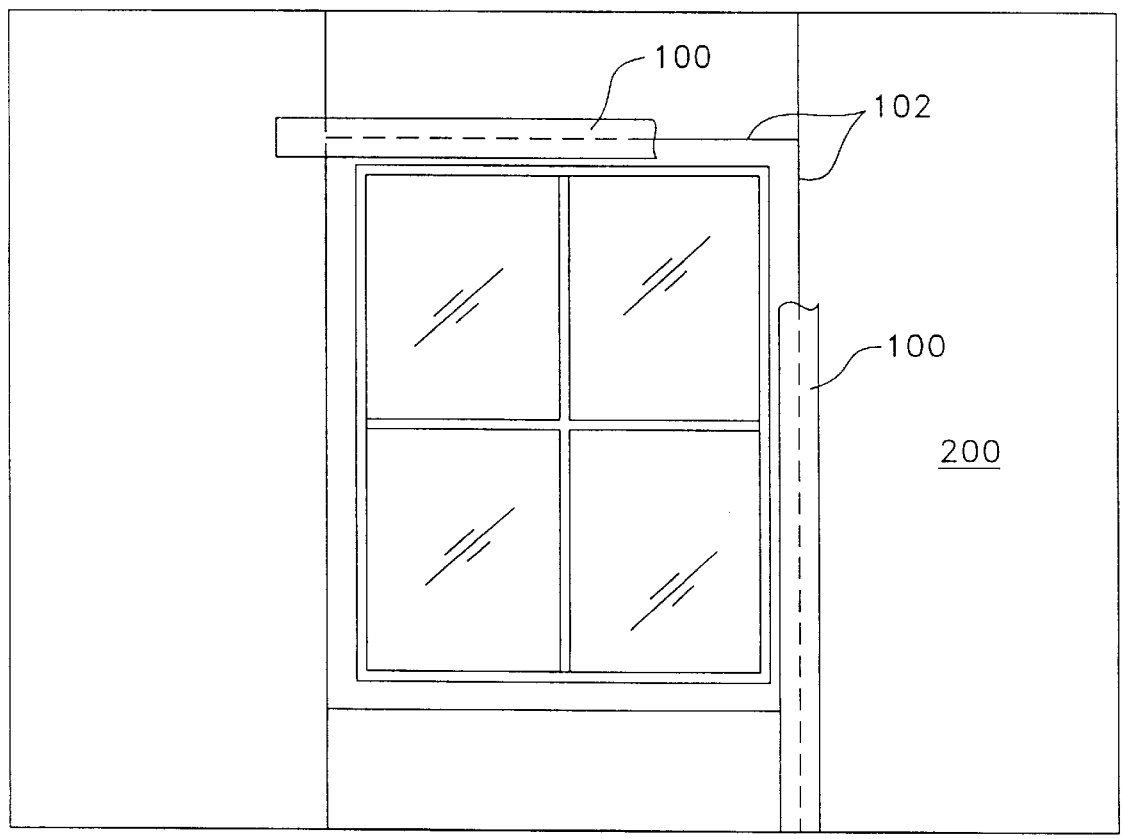
Figure 7:
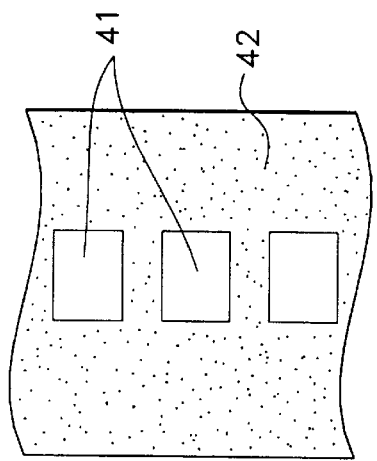
Figure 6:
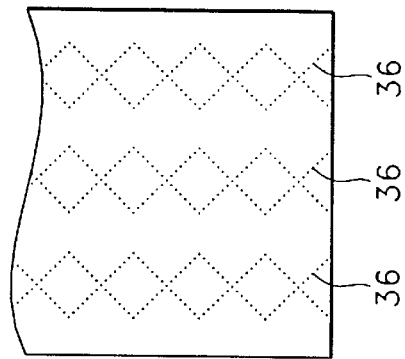
Figure 2:
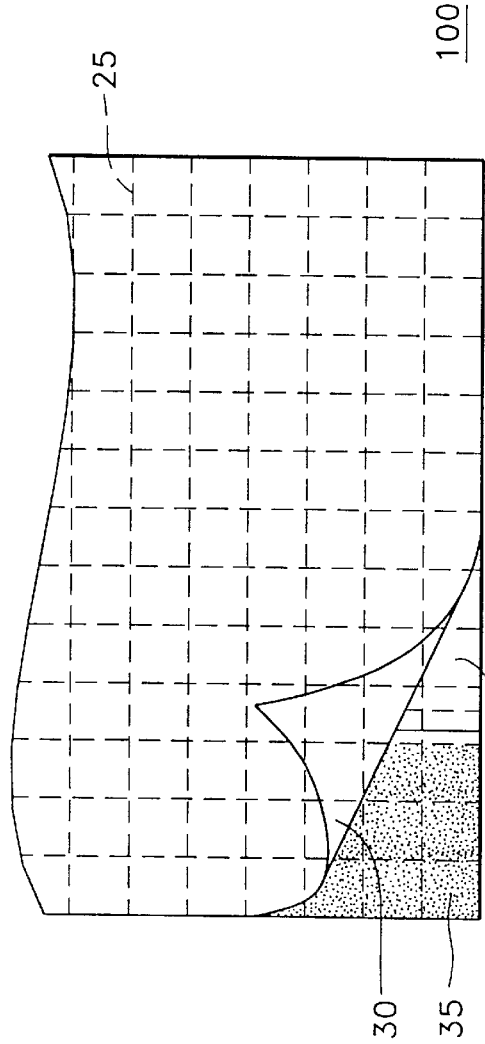
Figure 5:
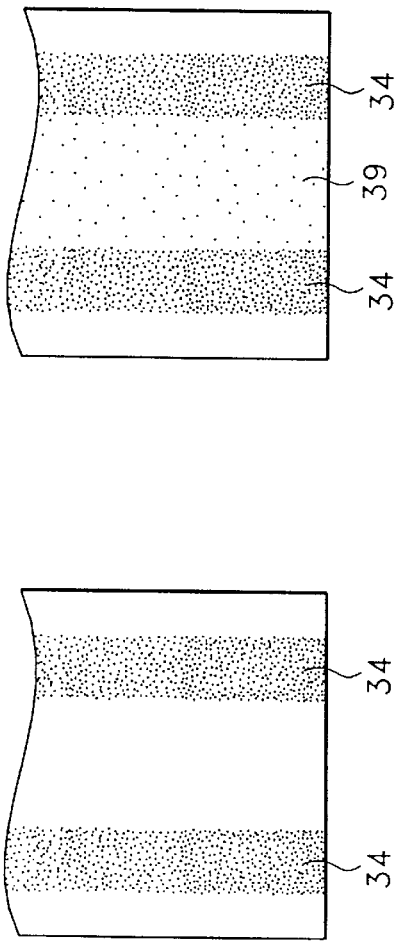
Figure 4:
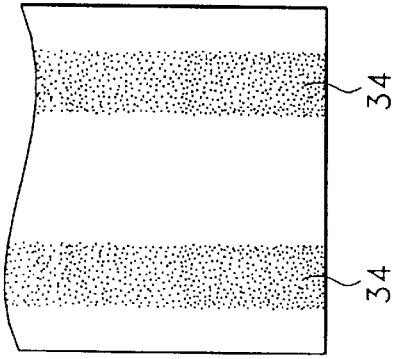

The accompanying drawings illustrate preferred embodiments of the invention according to the practical application of the principles thereof, and in which:

FIG. 1: is a partial, front perspective view of the preferred barrier laminate of this invention;

FIG. 2: is a partial, bottom plan view, illustrating a peel-back view of one corner thereof, of the barrier laminate of FIG. 1;

FIG. 3: is a front plan view of a building substrate showing a gap covered with the preferred barrier laminate of this invention;

FIG. 4: is a partial bottom plan view of an alternative adhesive means for the barrier laminate of this invention;

FIG. 5: is a partial bottom plan view of an alternative adhesive means for the preferred laminate of this invention;

FIG. 6: is a partial bottom plan view of an alternative adhesive means for the preferred laminate of this invention; and FIG. 7: is a partial bottom plan view of another adhesive means for the preferred laminate.

A DETAILED DESCRIPTION OF THE INVENTION

Laminated barrier strips, patches, layers, wraps and covers, building structures sealed with barrier laminates and processes for preparing barrier laminates and applying them to structures are provided by this invention. It is understood that these barrier materials can be used for applications outside of the building and construction industry. For example, the breathable water-resistant composites of this invention could have application in the medical, filtration, packaging and garment industry as a substitute for surgical adhesive tapes, packaging tapes, GOR-TEX® fabrics, or spun bonded and microperforated polyolefins, for example.

With regard to the figures, and particularly to FIGS. 1 and 2 thereof, there is shown a preferred barrier laminate 100 having a series of layers for providing unique properties. The barrier laminate 100 includes a pair of cellulosic webs 10 and 20 having a scrim 25 laminated therebetween. The webs 10 and 20 are treated with a latex polymeric resin which narrows the pores through the webs or renders them hydrophobic, or both, so as to substantially prohibit the penetration of liquid water, while not substantially interfering with the transmission of water vapor. The polymeric resin also helps to improve the wet and dry mechanical properties of the normally flimsy cellulosic web materials.

The cellulosic web layers 10 and 20 of this invention preferably are inexpensive, porous substrates. As used herein, the term "cellulosic" means that the webs contain at least about 30% and more preferably greater than 60% cellulosic fiber. Such fibers are known to contain, for example, lignocellulose found in wood and cotton, and more specifically, textile fibers from flax, jute, hemp and ramie; leaf fibers from sisal or abaca, seed and fruit fibers; recycled paper; non-textile fibers from hard or soft wood, and so on. One or more webs are preferably laminated with the reinforcing mat or scrim material to improve tensile strength. In the preferred embodiment of this invention the web layer includes a tissue-like cellulose layer, or a tissue-like web made of cellulose fibers reinforced with polymeric and/or inorganic fibers. Ideal materials which have open pores and have an affinity towards latex resins are most preferred. These include one or more layers of tissue paper, wet laid, carded, or non-woven layers including pulp fibers and glass or synthetic fiber blends, such as polyethylene or polypropylene.

In one preferred embodiment, a pair of lightweight tissue paper layers is provided. Tissue paper containing pulp fibers is a rather unconventional substrate for exterior barrier strips, since it is readily deteriorated by water and has poor mechanical properties, even in a dry state. This invention takes advantage of the low cost of such materials and provides improved tensile strength and liquid water resistance by the addition of a thin reinforcing mat and resinous saturant.

The reinforcing mat or scrim 25 of this invention is desirably made from a fibrous material having a "tensile strength," measured in pounds per square inch (psi.) which is significantly greater than the tensile strength of the cellulosic webs 10 and 20, for example at least 25% greater. The reinforcing mat can be in the form of a non-woven or woven material, such as a scrim or fabric. Preferred fibers include polyester, glass, rayon, or combinations thereof. Various deniers and scrim patterns could be used so long as the patterns are tearable and provide for easy penetration by water vapor. In the most preferred embodiment, the reinforcing layer has a relatively open porosity which contains pores which are significantly greater than the porosity of the web. More preferably the average diameter of the pores in the reinforcing layer is greater than the average diameter of the pores in the web. The reinforcing mat can even be liquid water pervious, since the treated cellulosic webs 10 and 20 will eventually be sufficient to repel water by themselves.

The preferred webs 10 and 20 and scrim 25 are bonded or laminated together to form a single composite either prior to or after the resinous saturant is applied. Typical bonding and lamination procedures include those that involve adhering the webs 10 and 20 and scrim 25 together with an adhesive, or using heat, pressure or both to combine these materials. The resulting layer has a thickness of about 1–25 mils, preferably about 3–10 mils, and can be torn by hand with no more effort than that required to tear a piece of paper, and substantially less than the tear resistance of spun-bonded polyethylene mat of like thickness.

The preferred water-resistant polymeric coating of this invention should be compatible with the fibers of the web so as to penetrate through a significant portion of the web, preferably to saturate the web, to decrease the size of its pores or increase its resistance to liquid-wetting.

Examples of materials which have been reported as being effective for improving the water-resistant properties of cellulosic or paper webs are the following: lattices of vinyl acetate, vinyl chloride, acrylics, acrylonitrile, and ethylene in addition to the monomers of styrene, butadiene, and isoprene, poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum waxes in the form of an emulsion and either residual fuel oil and rosin; aromatic isocyanates and diisocyanates; organohydrogenpolysiloxanes; silicone oils and emulsions; a wax-asphalt emulsion with or without such materials as potassium sulfate, alkali and alkaline earth aluminates; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. In the preferred embodiment of this invention, acrylic latex containing about 5–75% solids, preferably about 10–50% solids, is employed. Ideally, the acrylic latex will have a coating weight of about 15 to 80wt.% of the dry weight of the uncoated laminate.

The preferred polymeric coating of this invention can impart strength, water resistance, tear properties and weatherability to the selected web materials. In addition to the resin component, additional water repellents, for resisting water if glue or ink is applied before lamination; fluorochemical additives for imparting oil and/or water resistance; pigments, such as white pigment for improving opacity for print quality and appearance and improving UV resistance; crosslinking agents for improving wet strength, stiffness and reducing blocking in the laminated roll; and processing aides, to assist in the coating or saturating process, can be employed. Other additives will become apparent to those skilled in the art following the principles of this invention.

On the lower surface of the barrier laminate 100 is an optional adhesive layer 35 for applying the laminate 100 to a building substrate. The adhesive layer 35 is ideally protected by a backing layer 30, although it is envisioned that the barrier strip 100 could be adhered to the top surface of an underlying portion of itself in a roll configuration, much like a roll of tape.

As illustrated in FIG. 3, the preferred laminate 100 can be applied simply by peeling back the backing layer 30 to reveal the adhesive layer 35. The major surface of this laminate 100 revealed under the backing layer 30 provides a pair of adhesive layers along the outer longitudinal edges of the laminate 100 with a non-adherent surface 37 disposed therebetween. Upon applying the laminate 100 to a gap or seam in a building substrate 200 shown in FIG. 3, the preferred adhesive layer 35 is designed to straddle the gap or seam so that water vapor exiting from the building can pass through the non-adherent surface 37, which is free of potentially pore-blocking adhesive. The adhesive layer 35 can take on a number of configurations, including continuous and intermittent adhesive strips, low and high density layers, cross-hatching, and selected printing patterns. As described in FIGS. 4–7, a number of preferred patterns is provided. FIG. 4 describes a printed pattern containing a pair of longitudinal strips approximately 0.25 inches in width and spaced from the outer edge of the strip by approximately 0.125–0.25 inches. This edge spacing permits a corner of the strip to be pulled back more easily by the fingers of a worker.

As shown in FIG. 5, the nonadherent layer 37 could be substituted with a low density adhesive layer 39, designed to assist in adhering the laminate 100 to an underlying substrate without interfering with the penetration of water vapor from the structure. Additionally, a cross-hatch adhesive layer 36, as shown in FIG. 6, or an adhesive layer 42 with central windows 4-1 of nonadherent surface can be provided.

The adhesive elements of this invention can be made of any known pressure-sensitive adhesive material. As used herein, the term "pressure-sensitive" refers to any releasable adhesive or releasable tenacious means. Adhesive compositions suitable for barrier strips include, for example, the water-based pressure-sensitive adhesives such as acrylate adhesives, e.g. isooctyl acrylate and acrylic acid copolymer, or vinyl acetate-2 ethyl hexyl acrylate copolymer which can be combined with tackifiers. Alternatively, the adhesive may comprise the rapid setting thermoplastic "hot melt" adhesives. The adhesive elements may also comprise a two-sided adhesive tape. It is also anticipated that adhesives based on an elastomer selected from natural or synthetic rubbers could be used. It will be understood that alternative shapes for these adhesives, for examples, lines, squares, dots, circles, etc., may be employed.

The backing layer 30 is desirably a paper substrate coated with wax or silicone so that it can be easily removed from the pressure-sensitive adhesive layer 35.

EXAMPLE I

A laminated barrier material is provided by laminating two layers of cellulose tissue paper having a basis weight of about 11 lbs. per ream and a wet-strength additive to a polyester non-woven mesh at 200 psi. and about 300° F. The paper/scrim/paper laminate is saturated in a self-crosslinking acrylic latex and melamine-formaldehyde solution until fully saturated. The composite is then contact dried on steam-heated cans and calendared under heat and pressure to provide a thin laminated barrier strip.

The strip produced by this Example was found to be water-resistant under the accelerated weathering parameters of ASTM-D5105 without excessively impeding moisture vapor transmission. The resulting product is substantively different and far exceeds the properties of the resin, scrim and tissue paper alone.

From the foregoing, it can be realized that this invention provides tearable barrier laminates, including strips, patches, wraps, layers and covers, manufacturing techniques, as well as procedures for applying such laminates to buildings so as to create a liquid water barrier without interfering with the transmission of water vapor. By substituting inexpensive cellulosic webs with reinforcing and water-resistant layers, the price of barrier materials can be dramatically reduced without a loss in properties. Although various embodiments have been illustrated, this was for the purpose of describing, but not limiting the invention. Various modifications, which will become apparent to one skilled in the art, are within the scope of this invention described in the attached claims.

What is claimed is:

1. A process of preparing a tearable barrier laminate, comprising:

providing a fiber-reinforced layer having a first tensile strength and having two sides;

providing two layers of a porous cellulosic web having a second tensile strength which is less than said first tensile strength;

laminating each side of said reinforced layer with a respective layer of said web; and saturating both layers of said web with a water-resistant resinous material so as to substantially prohibit the penetration of liquid water, while not substantially interfering with the transmission of water vapor.

2. The process of claim 1 wherein said laminating step comprises using heat, pressure, or both.

3. The process of claim 1 wherein said impregnating step comprises applying a latex resin onto a first side of said porous web, and permitting said latex to dry.

4. A process of preparing a tearable barrier laminate, comprising:

providing a fiber-reinforced layer having a first tensile strength;

providing a porous tissue paper web having a second tensile strength which is less than said first tensile strength;

laminating said fiber-reinforced layer with said web; and saturating said web with a water-resistant resinous material, so as to substantially prohibit the penetration of liquid water, while not substantially interfering with the transmission of water vapor.

5. A process according to claim 4, wherein the laminating step includes laminating at a pressure of 200 psi and a temperature of about 300° F.

6. A process according to claim 4, wherein the saturating step includes saturating the web and the fiber-reinforced layer in a self-crosslinking acrylic latex and melamine-formaldehyde solution.

7. A process according to claim 4, wherein the process further comprises:

contact drying the laminate; and calendaring the laminate under heat and pressure.

8. A process according to claim 4, wherein the laminating step includes laminating a respective tissue paper web on each side of the fiber-reinforced layer.

9. A process of preparing a tearable barrier laminate, comprising:

providing a polyester non-woven layer having a first tensile strength;

providing a pair of porous tissue paper webs having a second tensile strength which is less than said first tensile strength;

laminating a respective tissue paper web on each side of the polyester non-woven layer;

saturating said laminate with a self-crosslinking acrylic latex and melamine-formaldehyde solution, so as to substantially prohibit the penetration of liquid water, while not substantially interfering with the transmission of water vapor;

contact drying the laminate; and calendering the laminate under heat and pressure.

* * * * *